(12) United States Patent
Park et al.

(10) Patent No.: US 10,798,458 B2
(45) Date of Patent: Oct. 6, 2020

(54) OPERATION METHOD OF USER TERMINAL AND SERVER FOR SPONSORING REAL-TIME BROADCAST

(71) Applicant: KAKAO CORP., Jeju-si, Jeju-do (KR)

(72) Inventors: Jumyoung Park, Yongin-si (KR); Dong Ho Bae, Yongin-si (KR); Ju Sup Lee, Yongin-si (KR); Ki Hyun Kang, Sejong-si (KR); Mija Yoon, Seoul (KR); Geunyoung Choi, Seoul (KR); Yelim Jeong, Yongin-si (KR)

(73) Assignee: KAKAO CORP., Jeju-si, Jeju-do (KR)

( * ) Notice: Subject to any disclaimer, the term of this patent is extended or adjusted under 35 U.S.C. 154(b) by 0 days.

(21) Appl. No.: 16/234,611

(22) Filed: Dec. 28, 2018

(65) Prior Publication Data

US 2019/0297385 A1    Sep. 26, 2019

(30) Foreign Application Priority Data

Mar. 20, 2018 (KR) .................. 10-2018-0031837

(51) Int. Cl.
*H04N 21/4784* (2011.01)
*H04N 21/258* (2011.01)
*H04N 21/2187* (2011.01)

(52) U.S. Cl.
CPC ..... *H04N 21/4784* (2013.01); *H04N 21/2187* (2013.01); *H04N 21/25866* (2013.01)

(58) Field of Classification Search
None
See application file for complete search history.

(56) References Cited

U.S. PATENT DOCUMENTS

| | | | | |
|---|---|---|---|---|
| 2007/0288312 | A1* | 12/2007 | Wang | G06Q 30/0214 705/14.16 |
| 2008/0027814 | A1* | 1/2008 | Kulakowski | G06Q 30/02 705/14.26 |
| 2012/0265604 | A1* | 10/2012 | Corner | H04W 4/21 705/14.39 |
| 2015/0235276 | A1* | 8/2015 | Wilson | G06Q 30/0273 705/14.69 |

* cited by examiner

*Primary Examiner* — James R Marandi
(74) *Attorney, Agent, or Firm* — Cantor Colburn LLP

(57) ABSTRACT

A user terminal and a server for supporting a real-time broadcast are disclosed. The user terminal may obtain, through a real-time broadcast platform, a free first sponsorship item for which a preset restrictive condition is set, and support, through the real-time broadcast platform, a streamer of the real-time broadcast using the first sponsorship item under the restrictive condition. In response to the supporting, a reward which is the same as a reward for a charged second sponsorship item may be provided.

19 Claims, 6 Drawing Sheets

FIG. 3

|  | First class | Second class | Third class | Fourth class | Fifth class |
|---|---|---|---|---|---|
| Chat message exposure time | 1 hr. | 30 min. | 15 min. | 1 min. | 10 sec. |
| Chat message exposure effect | Select color and highlight | Select color or highlight | None | None | None |
| Personacon assigned | O | O | X | X | X |
| Sponsorship ranking exposed | O | O | X | X | X |
| Dedicated ticker provided | O | X | X | X | X |
| Entry into main broadcast | O | X | X | X | X |

OPERATION METHOD OF USER TERMINAL AND SERVER FOR SPONSORING REAL-TIME BROADCAST

CROSS-REFERENCE TO RELATED APPLICATION(S)

This application claims the benefit under 35 USC § 119(a) of Korean Patent Application No. 10-2018-0031837 filed on Mar. 20, 2018, in the Korean Intellectual Property Office, the entire disclosure of which is incorporated herein by reference for all purposes.

BACKGROUND

1. Field

The following description relates to an operation method of a user terminal and a server for sponsoring a real-time broadcast.

2. Description of Related Art

Recently, live streaming services are widely used in various industrial fields including, for example, news, sports, games, user generated contents (UGCs), and telepresence.

In addition, real-time broadcasting services provided by individual broadcast producers that produce and provide real-time broadcasts of various fields through smartphones have become more prevalent. In the meantime, viewers may support live or real-time broadcasts and/or producers of the broadcasts by watching broadcasts, participating in chats, and supporting broadcasts of interest or producers of the broadcasts.

For example, a viewer may purchase a sponsorship item through a real-time broadcast platform and thereby support a producer of a real-time broadcast using the purchased sponsorship item. The sponsorship item may be turned into real money, and the producer receiving the support from the viewer may receive an amount of money equivalent to the purchased sponsorship item after paying a corresponding commission on the purchased sponsorship item to the real-time broadcast platform.

Such a sponsorship item may be used to create profits for both an entity providing the real-time broadcast platform and the producer of the real-time broadcast, and thus the entity providing the real-time broadcast platform may implement a function of rewarding the viewer for using the sponsorship item and reward the viewer with real-time contents such as, for example, reactions.

However, only a limited number of viewers may purchase sponsorship items to support real-time broadcasts, and most of viewers watching real-time broadcasts may not have a direct experience of providing a support to the real-time broadcasts and they thus may not feel the necessity of support or not enjoy the direct experience of support. Thus, there is a desire for a method of encouraging a viewer to support a real-time broadcast.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operation method of a user terminal includes obtaining, by the user terminal, a free first sponsorship item through a real-time broadcast platform, and supporting, by the user terminal, a streamer of a real-time broadcast using the first sponsorship item under a restrictive condition through the real-time broadcast platform. A reward to be provided to a viewer supporting the streamer with the first sponsorship item may be the same as a reward to be provided to a viewer supporting the streamer with a charged second sponsorship item for which the restrictive condition is not set.

The reward for the first sponsorship item may include at least one of a first-type reward by which a supporter, from among viewers of the real-time broadcast, supporting the streamer and an amount of support are exposed on the real-time broadcast, and a second-type reward by which a sponsorship rating of the supporter is updated based on the amount of support on the real-time broadcast.

The operation method may further include providing an interface encouraging the viewer to purchase the second sponsorship item through feedback based on the reward for the first sponsorship item.

For the first sponsorship item, the restrictive condition may be preset. The restrictive condition may include at least one of a first condition on an expiration date, a second condition on a service, a third condition on a streamer, a fourth condition on a time of use, and a fifth condition on a type of contents.

When a sponsorship rating of the viewer is updated in the real-time broadcast in return for the reward for the first sponsorship item, at least one of functions through which the viewer participates in the real-time broadcast may be upgraded.

A first commission on the first sponsorship item and a second commission on the second sponsorship item may be set to be different from each other. The first commission and the second commission may be set to be different from each other based on the restrictive condition.

When a total amount of first sponsorship items distributed in a real-time broadcast platform is determined, and a previously distributed first sponsorship item is determined to correspond to a retrieval condition, the previously distributed first sponsorship item may be retrieved and the retrieved first sponsorship item may be redistributed in the real-time broadcast platform.

The obtaining of the first sponsorship item may include obtaining the first sponsorship item based on participation of the viewer in the real-time broadcast.

The participation of the viewer may include at least one of viewing the real-time broadcast, viewing a chat on the real-time broadcast, participating in the chat during the real-time broadcast, purchasing the second sponsorship item, and setting a profile of the viewer.

In another general aspect, an operation method of a server includes determining, by the server, a target viewer receiving a free first sponsorship item based on participation of viewers in a real-time broadcast platform, providing, by the server, the first sponsorship item to the determined target viewer, and providing a reward to the target viewer in return for a support provided by the target viewer with the first sponsorship item in the real-time broadcast platform. The reward may be the same as a reward provided to a viewer providing a support with a charged second sponsorship item for which a restrictive condition is not set.

The reward for the first sponsorship item may include at least one of a first-type reward by which a supporter, from among viewers of a real-time broadcast, supporting a streamer of the real-time broadcast and an amount of support are exposed on the real-time broadcast, and a second-type reward by which a sponsorship rating of the supporter is updated based on the amount of support on the real-time broadcast.

The operation method may further include providing an interface encouraging the target viewer to purchase the second sponsorship item through feedback based on the reward for the first sponsorship item.

When a sponsorship rating of the target viewer is updated on a real-time broadcast in return for the reward for the first sponsorship item, the operation method may further include upgrading at least one of functions through which the target viewer participates in the real-time broadcast.

The operation method may further include determining whether the first sponsorship item corresponds to a retrieval condition, retrieving the first sponsorship item based on a result of the determining, and redistributing the retrieved first sponsorship item in the real-time broadcast platform.

In still another general aspect, an operation method of a real-time broadcast platform providing a sponsorship function using a free first sponsorship item and a charged second sponsorship item, the operation method includes distributing the first sponsorship item free of charge, selling the second sponsorship item at a charge, and calculating an amount of money equivalent to a support provided to a streamer receiving at least one of the first sponsorship item and the second sponsorship item.

For each of the first sponsorship item and the second sponsorship item, an extrinsic characteristic associated with information to be exposed on a real-time broadcast and an intrinsic characteristic associated with information not to be exposed on the real-time broadcast may be defined. The extrinsic characteristic of the first sponsorship item may be the same as the extrinsic characteristic of the second sponsorship item, and the intrinsic characteristic of the first sponsorship item may be different from the intrinsic characteristic of the second sponsorship item.

Other features and aspects will be apparent from the following detailed description, the drawings, and the claims.

BRIEF DESCRIPTION OF THE DRAWINGS

FIG. 3 is a diagram illustrating examples of functions of participating in a real-time broadcast according to an example embodiment.

Figure 1:
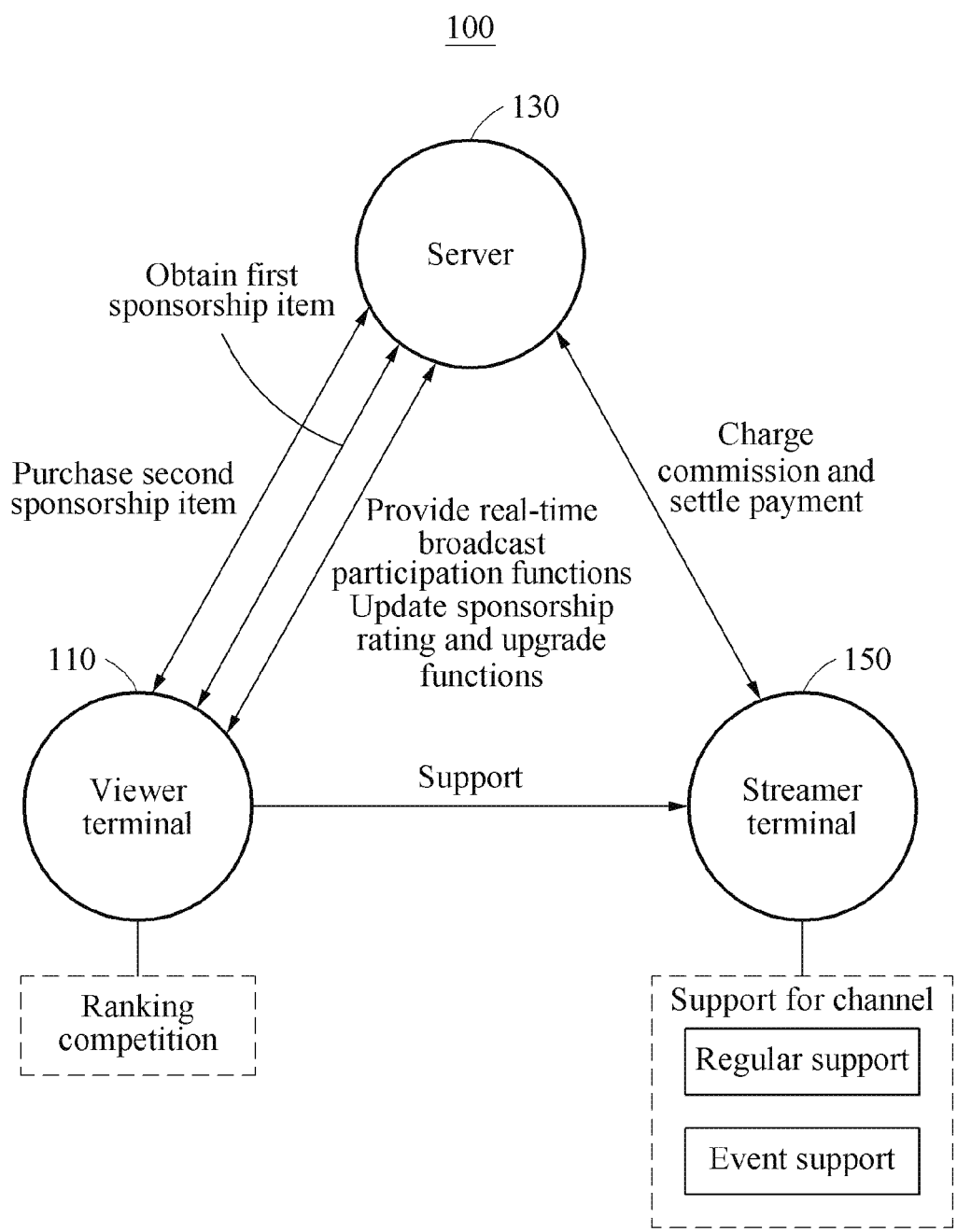
FIG. 1 is a diagram illustrating an example of a system for supporting a real-time broadcast according to an example embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness. Also, in the description of embodiments, detailed description of well-known related structures or functions will be omitted when it is deemed that such description will cause ambiguous interpretation of the present disclosure.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

FIG. 1 is a diagram illustrating an example of a system for supporting a real-time broadcast according to an example embodiment. Referring to FIG. 1, a system 100 includes a viewer terminal 110, a server 130, and a streamer terminal 150. In this example, communications among various entities included in the system 100 may be performed through a wired or wireless network (not shown). The wired or wireless network may use a standard communication technology and/or protocol.

The steamer terminal 150 may broadcast contents, for example, games, food, consulting, and the like, that are produced by itself, or relay contents, for example, sports, elections, and the like, that are produced by other entities. The viewer terminal 110 may be a user terminal viewing a real-time broadcast produced and/or relayed by the streamer terminal 150 or chatting on the real-time broadcast.

The server 130 may provide various functions for a real-time broadcast platform. Herein, the viewer terminal 110 and the streamer terminal 150 may also indicate a viewer account and a streamer account, respectively, that are used to receive functions of the real-time broadcast platform through the server 130.

The server 130 may provide a sponsorship function between the viewer terminal 110 and the streamer terminal 150. The term "sponsorship function" used herein may be construed as a function that enables the viewer terminal 110 to support the streamer terminal 150. In addition, the term "support" or "supporting" used herein may be used interchangeably with the term "sponsor" or "sponsoring." For example, the viewer terminal 110 may obtain a sponsorship item useable in the real-time broadcast platform and support the streamer terminal 150 with the obtained sponsorship item. The sponsorship item may be provided to the viewer terminal 110 from the server 130 to support the streamer terminal 150 and/or a streamer of the streamer terminal 150 and may include, for example, a cybercash or a cryptocurrency, a certain type of item, and the like.

The viewer terminal 110 may purchase a charged sponsorship item from the server 130. Although to be described in detail hereinafter, a viewer of the viewer terminal 110 may receive a free sponsorship item from the server 130 by, for example, participating a promotion, performing a certain action such as installing a certain application, performing a participation activity for which participation is promised in advance, purchasing a sponsorship item, and the like.

The viewer of the viewer terminal 110 may support the streamer terminal 130 with a sponsorship item by selecting icons, buttons, or other user interfaces (UIs), that are indicated as "sponsor" or "give cookies" on a display of the viewer terminal 110 while the real-time broadcast is being broadcasted through the real-time broadcast platform.

The server 130 may count a cumulative number of sponsorship items obtained by viewers for each streamer terminal or each real-time broadcast channel, and inform the streamer terminal 130 of the cumulative number of sponsorship items on a regular basis. For example, the server 130 may inform the streamer terminal 150 of a number of sponsorship items accumulated for a certain period of time, a total number of sponsorship items accumulated since the real-time broadcast starts, and the like. The server 130 may inform the streamer terminal 150 of an amount of money equivalent to the cumulative number of sponsorship items or a total cumulative amount of money earned from sponsorship items accumulated since the real-time broadcast starts.

The streamer terminal 150 may make profits using the sponsorship item. The server 130 may impose or charge, as a commission, a portion of the profits made from the sponsorship item in return for providing the real-time broadcast platform, and collect the commission from the streamer terminal 150.

The server 130 may provide a reward to the viewer terminal 110 to activate the sponsorship function. For example, the server 130 may expose the viewer terminal 110 providing the support to the streamer terminal 150 on the real-time broadcast, or upgrade a sponsorship rating of the viewer terminal 110 in the real-time broadcast. The sponsorship rating may be a ranking to which a result of supporting the streamer terminal 150 and/or the real-time broadcast by the viewer of the viewer terminal 110 with a sponsorship item is applied. The sponsorship rating may be determined based on a cumulative number of sponsorship items obtained by the viewer of the viewer terminal 110 for all real-time broadcasts, or on a number of sponsorship items obtained by the viewer of the viewer terminal 110 for each streamer or each streamer terminal. Alternatively, the sponsorship rating may be determined based on a number of sponsorship items obtained for all real-time broadcasts or for a certain real-time broadcast or a certain streamer, for a predetermined period of time. For example, the sponsorship rating may be classified into a very very important person (VVIP) class, a very important person (VIP) class, a gold class, a silver class, and the like, or into a first class, a second class, a third class, and the like.

In addition, the streamer of the streamer terminal 150 receiving the support from the viewer of the viewer terminal 110 with the sponsorship item may respond to the support through a real-time content, for example, a reaction, to enlist continued support.

In general, a charged sponsorship item may refer to a sponsorship item that is sold to a viewer at a charge. In this general case, many viewers may not purchase such a charged sponsorship item, and indirectly experience what another viewer purchasing the charged sponsorship item and obtaining a reward in return for the purchased sponsorship item experiences.

In the example illustrated in FIG. 1, the server 130 may provide a free sponsorship item to the viewer terminal 110. The viewer terminal 110 may support the streamer terminal 150 by using the free sponsorship item, as if supporting the streamer terminal 150 by using the charged sponsorship item. In such a case, the server 130 may provide, to the viewer terminal 110 for the support with the free sponsorship item, the same reward as a reward provided to a viewer terminal for a support with the charged sponsorship item, such that the viewer of the viewer terminal 110 may directly experience what a viewer of the viewer terminal using the charged sponsorship item for the support experiences. In addition, the server 130 may not allow the streamer terminal 150 to identify whether the streamer is supported through the charged sponsorship item or the free sponsorship item, such that the viewer terminal 110 may receive substantially the same reaction from the streamer of the streamer terminal 150 as if receiving one by supporting the streamer with the charged sponsorship item.

Hereinafter, the free sponsorship item and the charged sponsorship item will be referred to as a first sponsorship item and a second sponsorship item, respectively.

The first sponsorship item may be a one-time or pop-up item provided to the viewer terminal 110. The first sponsorship item may be of a type of cybercash represented by, for example, cookies and other types of icons, and provided to the viewer terminal 110.

As described above, the viewer terminal 110 may purchase the second sponsorship item from the server 130. Dissimilar to the first sponsorship item provided by the server 130 free of charge, the second sponsorship item may be provided at a charge and purchased by the viewer terminal 110. However, a reward for the first sponsorship item and a reward for the second sponsorship item may be the same. The viewer terminal 110 may use the first sponsorship item or the second sponsorship item to support the real-time broadcast produced by and/or transferred from the streamer terminal 150, or support the streamer of the real-time broadcast.

Dissimilar to the second sponsorship item, the first sponsorship item may have restrictive conditions. For the first sponsorship item, the restrictive conditions may be preset. For example, the restrictive conditions may be on a free cookie with an expiration date, an event cookie usable only for a certain service or at a certain time, an event cookie usable only by a streamer producing a certain real-time broadcast, and the like. The restrictive conditions set for the first sponsorship item will be described in further detail with reference to FIG. 2.

In an example, an extrinsic characteristic and an intrinsic characteristic may be defined for a sponsorship item. The extrinsic characteristic may be associated with information to be exposed on a real-time broadcast when a viewer supports the real-time broadcast and include, for example, an amount of support exposed on the real-time broadcast. The intrinsic characteristic may be associated with information not to be exposed on a real-time broadcast and include, for example, a restrictive condition on use of a sponsorship item, a ratio of a commission imposed on a streamer of the real-time broadcast to an amount of support.

To maximize an effect of encouraging the purchase of the second sponsorship item by distributing the first sponsorship item, an extrinsic characteristic of the first sponsorship item may be set to be the same as an extrinsic characteristic of the second sponsorship item. However, an intrinsic characteristic of the first sponsorship item may be set to be different from an intrinsic characteristic of the second sponsorship item according to various examples.

For example, the viewer terminal 110 may support the streamer or the streamer terminal 150 providing the real-time broadcast by obtaining a single sponsorship item for each broadcast. The viewer terminal 110 may support the streamer or the steamer terminal 150 for a certain period of time on a regular basis by obtaining a certain number of sponsorship items for a week. The viewer terminal 110 may provide a one-time support to the streamer or the streamer terminal 150 as an occasion by purchasing a sponsorship item equivalent to KRW 5,000 for a desired real-time broadcast or channel. The sponsorship rating of the viewer terminal 110 may be updated based on a result of the regular support and/or a result of the one-time support. The viewer of the viewer terminal 110 may compete with other viewers for sponsorship rankings to upgrade the sponsorship rating of the viewer.

The server 130 may select a target viewer receiving the free first sponsorship item from among viewers in the real-time broadcast platform. For example, the server 130 may determine, to be the target viewer, a viewer conducting a participation activity for which participation is promised in advance, or determine the target viewer by analyzing chats of the viewers.

For example, the server 130 may analyze a history of the viewer terminal 110 viewing a real-time broadcast, a history of the viewer terminal 110 viewing a chat on the real-time broadcast, or a history of the viewer terminal 110 participating in the chat, and the like, and provide the viewer terminal 110 with the first sponsorship item based on a result of the analyzing. Alternatively, the server 130 may provide the first sponsorship item to the viewer of the viewer terminal 110 selected as a significant viewer by the streamer terminal 150, or the viewer of the viewer terminal 110 of an initial real-time broadcast provided by a new streamer through the server 130. Alternatively, the server 130 may provide the first sponsorship item to the viewer terminal 110 that conducts a participation activity for which participation is promised in advance for a real-time broadcast, for example, the viewer terminal 110 that purchases the second sponsorship item for the real-time broadcast and then does not purchase a sponsorship item for more than a certain period of time recently, the viewer terminal 110 that purchases the second sponsorship item equivalent to a certain amount of money or greater for the real-time broadcast, and the viewer terminal 110 that sets profile information including a profile photo for the real-time broadcast, or to the viewer terminal 110 that participates in a certain event held in the real-time broadcast and then wins the event.

Alternatively, the server 130 may select a viewer migrating from a real-time broadcast platform provided by another entity or company, and provide the selected viewer with the first sponsorship item. The server 130 may select the viewer migrating from the real-time broadcast platform provided by another entity or company using various methods. For example, the server 130 may receive related information from the streamer terminal 150 migrating from the real-time broadcast platform provided by the other entity. Alternatively, the server 130 may set, to be a group of candidates for the viewer migrating from the real-time broadcast platform provided by the other entity, viewers participating in an initial broadcast of the streamer terminal 150 migrating from the real-time broadcast platform provided by the other entity or viewers participating in the real-time broadcast at a preset point in time, for example, a point in time promoted in advance.

When the support is provided through the first sponsorship item or the second sponsorship item, the server 130 may provide a reward to the viewer of the viewer terminal 110. The reward may include, for example, a first-type reward by which a supporter and an amount of support are exposed on the real-time broadcast, a second-type reward by which a sponsorship rating of the supporter is updated based on the amount of support in the real-time broadcast, and a combination thereof.

In addition, the server 130 may provide the viewer with a function of participating in the real-time broadcast which corresponds to the sponsorship rating of the viewer. The function of participating in a real-time broadcast may include, for example, a function of participating in a chat during the real-time broadcast, a function of entering a main broadcast of the real-time broadcast, and the like. Such a function of participating in a real-time broadcast will be described in detail with reference to FIG. 3.

The server 130 may update the sponsorship rating of the viewer providing the support by obtaining the first sponsorship item on the real-time broadcast to be the same as if providing a support by obtaining the charged second sponsorship item for which the restrictive conditions are not set. Herein, a sponsorship rating or a sponsorship ranking updated through a support may be notified through a message or a ticker during the real-time broadcast.

When the sponsorship rating of the viewer terminal 110 is updated, the server 130 may upgrade at least one of functions of participating in the real-time broadcast.

In an example, by encouraging the viewer of the viewer terminal 110 to experience a support for the real-time broadcast and/or the streamer using the first sponsorship item provided free of charge by the server 130, the viewer who is a potential supporter may be encouraged to purchase the second sponsorship item and thus to be an active supporter for the real-time broadcast and/or the streamer. In addition, the server 130 may notify sponsorship rankings to encourage viewer terminals supporting the real-time broadcast and/or the streamer to compete with one another, thereby promoting supports and exciting viewers interest through the competition.

The server 130 may also provide a function of making profits to the streamer terminal 150 receiving the support from the viewer terminal 110 through a sponsorship item. For example, the server 130 may provide the streamer terminal 150 with a function of converting the number of sponsorship items received by the streamer terminal 150 as supports into money or cash equivalent to the number of the sponsorship items. The server 130 may provide the cash to the streamer of the streamer terminal 150 by calculating an amount of money equivalent to the sponsorship items received by the streamer terminal 150.

In addition, the server 130 may give, to the streamer terminal 150 receiving the supports through the sponsorship items, various broadcasting-related benefits, for example, an improved quality for the real-time broadcast of the streamer terminal 150, an extended time for the real-time broadcast, an expanded channel for the real-time broadcast, and the like. In addition, the server 130 may give, to the streamer of the streamer terminal 150 and/or the real-time broadcast of the streamer terminal 150, various benefits related to supply, distribution, replay, and the like of the real-time broadcast.

Herein, a function to be provided to the streamer terminal 150 by the server 130 when a sponsorship item received by the streamer terminal 150 is the free first sponsorship item may be the same as that to be provided when the sponsorship item is the charged second sponsorship item. Thus, the function to be provided to the streamer terminal 150 may be the same irrespective of whether the sponsorship item is the first sponsorship item or the second sponsorship item. However, when the streamer terminal 150 converts a received sponsorship item into cash, different commissions may be imposed or charged by the server 130 based on whether the received sponsorship item is the free first sponsorship item or the charged second sponsorship item. For example, the server 130 may set a first commission on the first sponsorship item provided free of charge to be higher than a second commission on the second sponsorship item provided at a charge.

Alternatively, the first commission on the first sponsorship item and the second commission on the second sponsorship item may be differently set based on a restrictive condition, a type of contents of a real-time broadcast, a ranking of a streamer, and the like.

For example, the server 130 may set different commissions on sponsorship items based on a service provided by a real-time broadcast or a type of contents of the real-time broadcast. For example, in a case in which a type of contents of a real-time broadcast corresponds to a donation broadcast, an educational broadcast, and a game broadcast, the server 130 may set a commission for converting a sponsorship item into cash to be 0%, 0.5%, and 0.8%, respectively. The server 130 may also set different commissions based on whether a real-time broadcast is a publicly provided broadcast, for example, an official league game broadcast and an official election broadcast, or a general broadcast.

For another example, the server 130 may set, to be 0.1%, a commission to be imposed on a streamer of a first class which secure numerous viewers and enjoys high popularity. The server 130 may set, to be 1%, a commission to be imposed on a streamer of a fifth class with a low level of presence. In this example, the first commission may be set to be higher than the second commission even for the streamer of the first class.

According to an example, the server 130 may set different commissions based on a point in time at which each streamer settles a commission for a sponsorship item received. For example, the server 130 may set a commission to increase when a streamer postpones the settlement further.

In addition, the server 130 may apply different basic commissions for converting sponsorship items into cash based on an operation or management policy on the sponsorship items, or apply different rates to a commission based on an actual environment in which a sponsorship item is used.

In an example, when calculating an amount of money equivalent to sponsorship items received by the streamer terminal 150, the server 130 may not allow the streamer terminal 150 to identify a viewer supporting the streamer terminal 150 with the free first sponsorship item and a viewer supporting the streamer terminal 150 with the charged second sponsorship item. The viewer terminal 110 and the streamer terminal 150 may be, for example, a digital device that is equipped with a memory means and a microprocessor and has a computation ability, for example, a mobile communication terminal such as a smartphone, a desktop computer, a laptop computer, a workstation, a palmtop computer, a personal digital assistant (PDA), and a webpad.

The server 130 may be, for example, a single server computer or a system similar to this, one or more server banks, or a plurality of servers arranged differently. The server 130 may be provided in a single facility, or be a server cloud distributed at different geographical locations.

Figure 2:
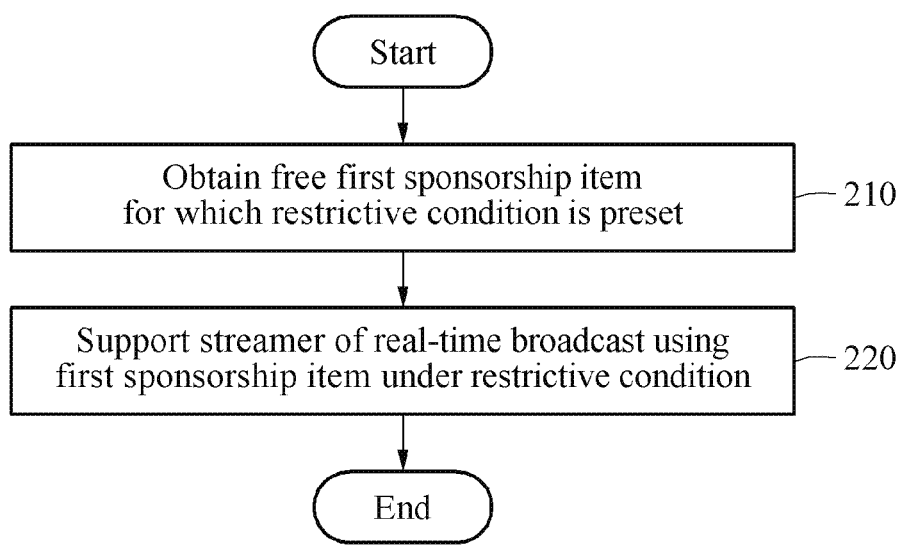
FIG. 2 is a flowchart illustrating an example of an operation method of a user terminal according to an example embodiment.

FIG. 2 is a flowchart illustrating an example of an operation method of a user terminal according to an example embodiment. Herein, a user terminal may correspond to a viewer terminal, and a user of the user terminal may correspond to a viewer of the viewer terminal. Referring to FIG. 2, in operation 210, a user terminal obtains a free first sponsorship item for which a restrictive condition is preset. The restrictive condition preset for the first sponsorship item may include, for example, a first condition on an expiration date, a second condition on a service, a third condition on a streamer, a fourth condition on a time of use, a fifth condition on a type of contents, or various combinations thereof.

For example, the first condition may be set to allow the first sponsorship item to be used within a valid period of time, for example, within three days, one week, ten days, or an election period (e.g., June 12 to July 11), from a date when the first sponsorship item is issued. The second condition may be set to allow the first sponsorship item to be used for a service of corresponding contents during a XX league game, or for a broadcast service to which a certain badge is assigned. The third condition may be set to allow the first sponsorship item to be used only for a certain streamer, a new streamer who hosts a real-time broadcast for the first time, or a streamer with a high popularity ranking. The fourth condition may be set to allow the first sponsorship item to be used on a certain date, for example, Valentine's Day and Christmas Day. The fifth condition may be set to allow the first sponsorship item to be used for a certain type of contents, for example, a donation broadcast, a religion broadcast, an entertainment broadcast, an educational broadcast, and the like.

For example, the user terminal may obtain the first sponsorship item based on participation of a user of the user terminal in a real-time broadcast in operation 210. The participation in a real-time broadcast may include, for example, viewing the real-time broadcast, viewing a chat on the real-time broadcast, participating in a chat during the real-time broadcast, purchasing a second sponsorship item for the real-time broadcast, setting a profile photo of the user, and the like.

For example, in a case in which the first sponsorship item is to be provided to first 100 viewers on a first-come-first-served basis among viewers of an A broadcast scheduled to be broadcasted on a preset date for the first time, and the user of the user terminal is one of the first 100 viewers of the A broadcast, the user terminal may obtain the first sponsorship item. In a case in which there is an attendance event where the first sponsorship item is to be provided only when a viewer attends a real-time B broadcast every day, the user terminal may obtain the first sponsorship item by attending the B broadcast every day. Alternatively, the user terminal may obtain the first sponsorship item that is provided based on a predetermined participation activity, for example, a number of viewing of the chat during the real-time broadcast, a number of participation in the chat during the real-time broadcast, whether the second sponsorship item is purchased for the real-time broadcast, and whether the profile photo of the viewer is set. Herein, a number of first sponsorship items to be provided may be set, identically or differently, based on each type of participation activity.

According to an example, the user terminal may obtain the first sponsorship item without an additional condition on, for example, the participation of the user. For example, a user terminal to which the first sponsorship item is to be provided may be randomly selected from among all user terminals.

In operation 220, the user terminal supports a streamer of the real-time broadcast using the first sponsorship item under the restrictive condition. In response to the support, the user terminal may receive a reward for the support with the first sponsorship item. The reward may the same as a reward for a support with a charged second sponsorship item. For example, a sponsorship rating of the user obtaining the first sponsorship item for the support for the real-time broadcast may be updated to be the same as a sponsorship rating to be obtained from the support provided through the charged sponsorship item for which the restrictive condition is not set.

In an example, the sponsorship rating may be updated based on at least one of a cumulative result of support provided by a viewer and a result of one-time support provided by a viewer. The cumulative result of support may include, for example, a cumulative amount of money equivalent to the support, a cumulative number of sponsorship items, a total support period, a total number of broadcasts supported by the viewer, a total number of streamers supported by the viewer, and the like. The result of one-time support may include, for example, an amount of money equivalent to the one-time support provided by the viewer, for example, KRW 100,000.

In addition, the sponsorship rating may be determined based on the cumulative result of support provided by a viewer. For example, when a support period is less than three months, greater than or equal to three months to less than six months, greater than or equal to six months to less than one year, and greater than or equal to one year, the sponsorship rating of the viewer may be determined to be a beginner class, a silver class, a gold class, and a star class, respectively, on a cumulative basis. Alternatively, the sponsorship rating may be determined based on the result of one-time support provided by a viewer. For example, when an amount of money used for the support, for example, an amount of money equivalent to a sponsorship item obtained by the viewer for the support is less than KRW 1,000, greater than or equal to KRW 1,000 to less than KRW 3,000, greater than or equal to KRW 3,000 to less than KRW 5,000, greater than or equal to KRW 5,000 to less than KRW 10,000, and greater than or equal to KRW 10,000, the sponsorship rating of the viewer may be immediately determined to be a fifth class, a fourth class, a third class, a second class, and a first class, respectively.

The streamer of the real-time broadcast may convert the first sponsorship item into cash. The conversion into cash of a sponsorship item may be performed through a server. Herein, a first commission on the first sponsorship item and a second commission on the second sponsorship item may be set to be the same or different.

When the sponsorship rating is updated, at least one of functions set for the user to participate in the real-time broadcast may also be upgraded. Hereinafter, functions of participating in a real-time broadcast will be described in detail with reference to FIG. 3.

FIG. 3 is a diagram illustrating examples of functions of participating in a real-time broadcast according to an example embodiment. Referring to FIG. 3, functions of participating in a real-time broadcast may be determined based on a sponsorship rating of a viewer terminal.

In an example, functions of participating in a real-time broadcast may include, for example, a function of adjusting a period of time for which a chat message of a viewer of the viewer terminal is exposed to the real-time broadcast, a function of changing an effect of exposing the chat message of the viewer (e.g., changing a color of the chat message and changing a highlight of contents of the chat message), a function of assigning a unique individual icon or a personacon to the viewer, a function of assigning an icon or a badge corresponding to the sponsorship rating, a function of exposing the sponsorship rating of the viewer, a function of providing a viewer-dedicated ticker, a function of allowing the viewer to enter a main broadcast, and the like.

For example, in a case in which a sponsorship rating of a viewer is a first class, the viewer of the first class may receive assigned functions of participating in a real-time broadcast, for example, a function of exposing a chat message for one hour, a function of changing an effect of exposing the chat message (e.g., selecting a color and a highlight), a function of assigning a personacon, a function of exposing the sponsorship rating, a function of providing a dedicated ticker, a function of allowing the viewer to enter a main broadcast, and the like. In a case in which a sponsorship rating of a viewer is a third class, the viewer of the third class may receive assigned functions of participating in a real-time broadcast, for example, a function of exposing a chat message for 15 minutes, and the like. As described above, when the sponsorship rating of the viewer terminal is updated, a server may upgrade at least one of the functions of participating in the real-time broadcast based on the updated sponsorship rating.

The functions of participating in the real-time broadcast determined based on the sponsorship rating of the viewer terminal may be stored in a database of the server or a database of the viewer terminal, and changed or modified by a manager of the server.

Figure 4:
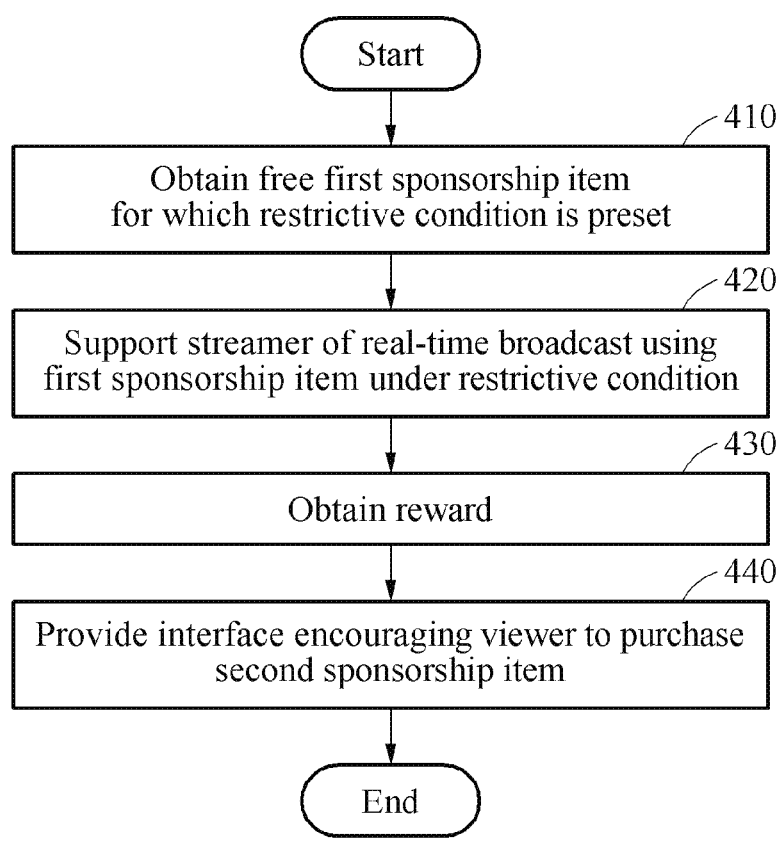
FIG. 4 is a flowchart illustrating an example of an operation method of a user terminal to encourage purchase of a charged sponsorship item according to an example embodiment.

FIG. 4 is a flowchart illustrating an example of an operation method of a user terminal to encourage a user to purchase a charged sponsorship item according to an example embodiment. Herein, a user terminal may correspond to a viewer terminal, and a user of the user terminal may correspond to a viewer of the viewer terminal. Referring to FIG. 4, in operation 410, a user terminal obtains a free first sponsorship item for which a restrictive condition is preset. In operation 420, the user terminal supports a streamer of a real-time broadcast using the first sponsorship item under the restrictive condition. Operations 410 and 420 correspond to operations 210 and 220 described above with reference to FIG. 2, respectively, and thus a more detailed description of these operations will be omitted here for brevity.

In operation 430, the user terminal obtains a reward in return for the support provided to the streamer in operation 420. The reward obtained by the user terminal may be feed a user of the user terminal back in various types. For example, a supporter and an amount of support may be exposed to a preset area of a chat window of the real-time broadcast. Alternatively, a sponsorship rating may be upgraded in the real-time broadcast, and the upgraded sponsorship rating may be directly exposed to the real-time broadcast. Alternatively, a function of participating in the real-time broadcast may be improved by the upgraded sponsorship rating, and the sponsorship rating may thus be indirectly exposed. In addition, the streamer receiving the support may respond to the support, with real-time contents, for example, a reaction and the like. Thus, the user who is also the supporter may have a different experience from other viewers.

In operation 440, the user terminal provides an interface encouraging the user to purchase a second sponsorship item through feedback on the reward. The interface encouraging the purchase of the second sponsorship item may be provided to the user through, for example, a UI 630 illustrated in FIG. 6. The user having a direct experience of the support with the free first sponsorship item may purchase the second sponsorship item which is provided at a charge.

Figure 5:
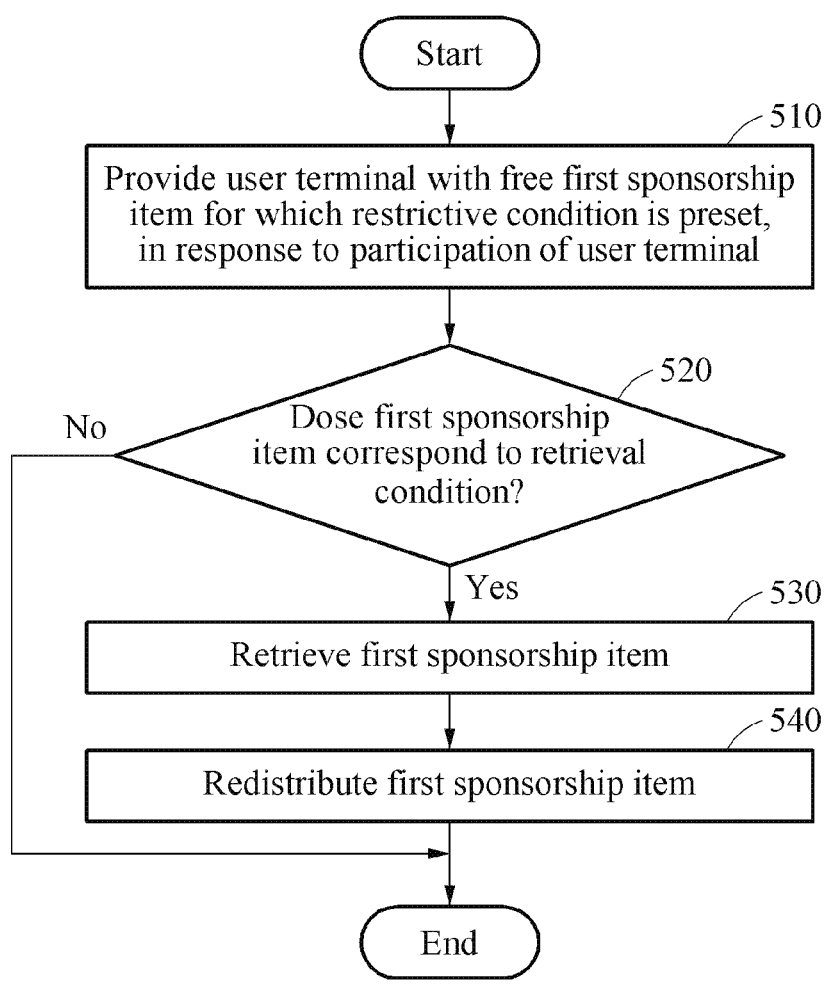
FIG. 5 is a flowchart illustrating an example of an operation method of a server to retrieve and redistribute a free sponsorship item according to an example embodiment.

FIG. 5 is a flowchart illustrating an example of an operation method of a server to retrieve and redistribute a free sponsorship item according to an example embodiment. Referring to FIG. 5, in operation 510, in response to participation of a user terminal in a real-time broadcast, a server provides, to the user terminal, a free first sponsorship item for which a restrictive condition is preset.

In operation 520, the server determines whether the first sponsorship item corresponds to a retrieval condition. For example, the retrieval condition may be applied when the first sponsorship item is not used within a certain valid period of time, for example, within three days or one week after the first sponsorship item is provided, when the first sponsorship item is not used on a certain date, for example, Christmas Day, a certain league date, and the like, or when a viewer obtaining the first sponsorship item has a history of being restricted in the participation in the real-time broadcast, for example, a history of being forced out of the real-time broadcast, a history of being restricted in participating in a chat of the real-time broadcast, and the like. The retrieval condition is limited to the examples described in the foregoing, and thus the retrieval condition may be applied to various situations based on an operation or management policy of the server.

In operation 530, when the first sponsorship item is determined to correspond to the retrieval condition in operation 520, the server retrieves the first sponsorship item. In operation 540, the server redistributes the retrieved first sponsorship item. For example, the server may change the retrieved first sponsorship item to a first sponsorship item to be used for another event, and reselect a target viewer to which the first sponsorship item is to be provided.

In an example, a first sponsorship item may be provided as a means of investment employed by an operator of a real-time broadcast platform to promote purchase of a second sponsorship item. A total amount of first sponsorship items to be issued in the real-time broadcast platform may be determined based on a strategy for the investment. By retrieving a previously distributed first sponsorship item according to the retrieval condition and reusing the retrieved first sponsorship item as described above with reference to FIG. 5, it is possible to improve expected effects from an amount of money used for the investment.

Figure 6:
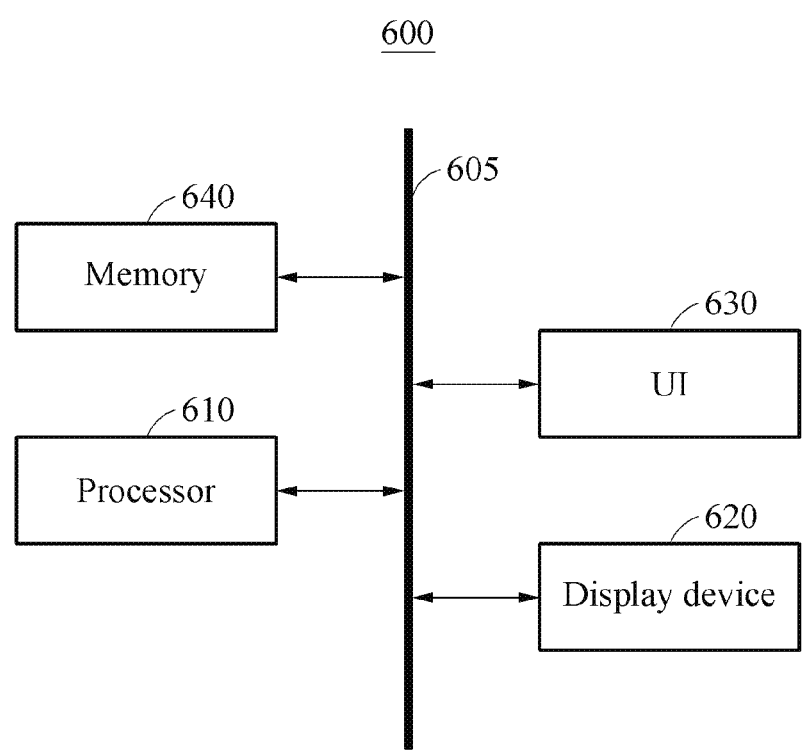
FIG. 6 is a diagram illustrating an example of a user terminal for supporting a real-time broadcast according to an example embodiment.

FIG. 6 is a diagram illustrating an example of a user terminal for supporting a real-time broadcast according to an example embodiment. Referring to FIG. 6, a user terminal 600 includes a processor 610 and a display device 620. The user terminal 600 further includes a UI 630 and a memory 640. The processor 610, the display device 620, the UI 630, and the memory 640 may be connected through a communication bus 605.

The processor 610 may obtain, from a server, a free first sponsorship item for which a restrictive condition is preset. The processor 610 may support a streamer of a real-time broadcast using the first sponsorship item under the restrictive condition. As a result of such support, a sponsor rating of a viewer supporting the real-time broadcast with the first sponsorship item may be updated to be the same as a case when the viewer supports the real-time broadcast with a charged second sponsorship item for which the restrictive condition is not set.

The display device 620 may provide the real-time broadcast.

The UI 630 may encourage the viewer to purchase the second sponsorship item through feedback based on the updated sponsor rating.

The memory 640 may store the preset restrictive condition, the sponsor rating of the viewer, and/or functions through which the viewer participates in the real-time broadcast.

The processor 610 may perform at least one of the methods described above with reference to FIGS. 1 through 5, or an algorithm corresponding to the at least one method. The processor 610 may execute a program, and control the user terminal 600. A program code of the program executed by the processor 610 may be stored in the memory 640.

The memory 640 may include a high-speed random-access memory (RAM), such as, for example, a dynamic RAM (DRAM), a static RAM (SRAM), a double data rate RAM (DDR RAM), and other high-speed access solid state memory devices. The memory 640 may include a volatile memory and a nonvolatile memory. The memory 640 may be selectively include at least one storage device located remotely from the processor 610.

Although not illustrated, the server may include a processor, a memory, and a communication interface. The processor may perform at least one of the methods described above with reference to FIGS. 1 through 5 or an algorithm corresponding to the at least one method. The processor may execute a program, and control the server or a providing apparatus. A program code of the program executed by the processor may be stored in the memory.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cybercash operation method performed by a viewer terminal, comprising:
    displaying, by the viewer terminal, a content provided by a streamer terminal through a real-time broadcast platform;
    obtaining, by the viewer terminal, a free first sponsorship item from the real-time broadcast platform, the first sponsorship item being a cybercash spendable only for a streamer account of the streamer terminal;
    detecting, by the viewer terminal, a selection of a menu for a request to spend the first sponsorship item on a display of the viewer terminal a restrictive condition to spend the first sponsorship item is met; and
    transmitting, by the viewer terminal, the request to spend the first sponsorship item to the real-time broadcast platform for count,
    wherein a reward to be provided to a viewer account of the viewer terminal in response to the request to spend the first sponsorship item is the same as a reward to be provided to the viewer account in response to a request to spend a charged second sponsorship item for which the restrictive condition is not set,
    wherein the second sponsorship item is a cybercash spendable only for the streamer account,
    wherein a first commission on the first sponsorship item and a second commission on the second sponsorship item are set to be different from each other.

2. The operation method of claim 1, wherein the reward for the first sponsorship item includes at least one of:
    a first-type reward by which the viewer account and an amount of support by the viewer account are exposed on the real-time broadcast; and
    a second-type reward by which a sponsorship rating of the viewer account is updated based on the amount of support on the real-time broadcast.

3. The operation method of claim 1, further comprising:
    providing an interface to purchase the second sponsorship item through feedback based on the reward for the first sponsorship item.

4. The operation method of claim 1, wherein, for the first sponsorship item, the restrictive condition is preset.

5. The operation method of claim 4, wherein the restrictive condition includes at least one of:
    a first condition on an expiration date;
    a second condition on a service;
    a third condition on the streamer account;
    a fourth condition on a time of use; and
    a fifth condition on a type of the content.

6. The operation method of claim 1, wherein, when a sponsorship rating of the viewer account is updated in the real-time broadcast in return for the reward for the first sponsorship item, at least one of functions through which the viewer account participates in the real-time broadcast is upgraded.

7. The operation method of claim 1, wherein a total amount of first sponsorship items distributed in the real-time broadcast platform is determined;
wherein, when a first sponsorship item previously distributed to the viewer terminal is determined to meet a retrieval condition, the first sponsorship item is retrieved; and
the retrieved first sponsorship item is redistributed in the real-time broadcast platform.

8. The operation method of claim 1, wherein the obtaining of the first sponsorship item comprises:
obtaining the first sponsorship item based on participation of the viewer account in the real-time broadcast.

9. The operation method of claim 8, wherein the participation of the viewer account includes at least one of:
viewing the real-time broadcast;
viewing a chat on the real-time broadcast;
participating in the chat during the real-time broadcast;
purchasing the second sponsorship item; and
setting a profile of a viewer of the viewer account.

10. A cybercash operation method performed by a server, comprising:
selecting, by the server, a target viewer account to receive a free first sponsorship item among viewer accounts based on participation of the viewer accounts in a real-time broadcast platform through which a content provided by a streamer terminal is broadcasted, wherein the first sponsorship item is a cybercash spendable only for a streamer account of the streamer terminal and a restrictive condition to spend the first sponsorship exists;
providing, by the server, the first sponsorship item to the selected target viewer account; and
providing, by the server, a reward to the target viewer account in return for spending the first sponsorship item through the real-time broadcast platform,
wherein the reward is the same as a reward provided to the viewer account in return for spending a charged second sponsorship item for which the restrictive condition is not set,
wherein the second sponsorship item is a cybercash spendable only for the streamer account,
wherein a first commission on the first sponsorship item and a second commission on the second sponsorship item are set to be different from each other.

11. The operation method of claim 10, wherein the reward for the first sponsorship item includes at least one of:
a first-type reward by which the target viewer account and an amount of support by the target viewer account are exposed on the real-time broadcast; and
a second-type reward by which a sponsorship rating of the target viewer account is updated based on the amount of support on the real-time broadcast.

12. The operation method of claim 10, further comprising:
providing an interface to purchase the second sponsorship item through feedback based on the reward for the first sponsorship item.

13. The operation method of claim 10, wherein, for the first sponsorship item, the restrictive condition is preset, wherein the restrictive condition includes at least one of:
a first condition on an expiration date;
a second condition on a service;
a third condition on the streamer account;
a fourth condition on a time of use; and
a fifth condition on a type of the content.

14. The operation method of claim 10, when a sponsorship rating of the target viewer account is updated on a real-time broadcast in return for the reward for the first sponsorship item, further comprising:
upgrading at least one of functions through which the target viewer account participates in the real-time broadcast.

15. The operation method of claim 10, further comprising:
determining whether the first sponsorship item distributed to the target viewer account meets a retrieval condition;
retrieving the first sponsorship item based on a result of the determining; and
redistributing the retrieved first sponsorship item in the real-time broadcast platform.

16. The operation method of claim 15, wherein the retrieval condition includes at least one of:
a condition applied when the first sponsorship item is not used by an expiration date;
a condition applied when the first sponsorship item is not used on a preset date; and
a condition applied when the target viewer account receives a penalty in the real-time broadcast platform.

17. The operation method of claim 10, wherein the participation of the viewer accounts includes at least one of:
having a history of viewing a real-time broadcast in the real-time broadcast platform;
having a history of viewing a chat in the real-time broadcast platform;
having a history of participating in a chat in the real-time broadcast platform;
having a history of purchasing the second sponsorship item in the real-time broadcast platform; and
setting a profile in the real-time broadcast platform.

18. A non-transitory computer-readable storage medium storing instructions that, when executed by a viewer terminal, cause the viewer terminal to:
display a content provided by a streamer terminal through a real-time broadcast platform,
obtain a free first sponsorship item from the real-time broadcast platform, the first sponsorship item being a cybercash spendable only for a streamer account of the streamer terminal,
detect a selection of a menu for a request to spend the first sponsorship item on a display of the viewer terminal when a restrictive condition is met to spend the first sponsorship item, and
transmit the request to spend the first sponsorship item to the real-time broadcast platform for count,
wherein a reward to be provided to a viewer account of the viewer terminal in response to the request to spend the first sponsorship item is the same as a reward to be provided to the viewer account in response to a request to spend a charged second sponsorship item for which the restrictive condition is not set,
wherein the second sponsorship item is a cybercash spendable only for the streamer account,
wherein a first commission on the first sponsorship item and a second commission on the second sponsorship item are set to be different from each other.

19. A cybercash operation method performed by a real-time broadcast platform providing a sponsorship function using a free first sponsorship item and a charged second sponsorship item, the operation method comprising:

distributing the first sponsorship item free of charge to a viewer account;

selling the second sponsorship item at a charge to the viewer account; and calculating an amount of money provided to a streamer account receiving at least one of the first sponsorship item and the second sponsorship item by calculating the amount of money equivalent to spent sponsorship item of the first and second sponsorship items, wherein each of the first and second sponsorship items is a cybercash spendable only for the streamer account, wherein a streamer terminal of the streamer account provides a content broadcasted through the real-time broadcast platform, wherein, for each of the first sponsorship item and the second sponsorship item, an extrinsic characteristic associated with information to be exposed on a real-time broadcast and an intrinsic characteristic associated with information not to be exposed on the real-time broadcast are defined, wherein the extrinsic characteristic of the first sponsorship item is the same as the extrinsic characteristic of the second sponsorship item, and the intrinsic characteristic of the first sponsorship item is different from the intrinsic characteristic of the second sponsorship item, wherein a restrictive condition to spend the first sponsorship item exists and the restrictive condition does not apply to the second sponsorship item, and wherein a first commission on the first sponsorship item and a second commission on the second sponsorship item are set to be different from each other.

* * * * *